United States Patent
Ivanova et al.

(10) Patent No.: US 10,073,726 B2
(45) Date of Patent: Sep. 11, 2018

(54) DETECTION OF OUTAGE IN CLOUD BASED SERVICE USING USAGE DATA BASED ERROR SIGNALS

(71) Applicant: Microsoft Technology Licensing, LLC, Redmond, WA (US)

(72) Inventors: Olga Ivanova, Redmond, WA (US); Venkat Narayanan, Redmond, WA (US); Smita Ojha, Seattle, WA (US); Lei He, Redmond, WA (US); Art Sadovsky, Bellevue, WA (US); Yi Wang, Redmond, WA (US); Ashish Premaraj, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 14/475,543

(22) Filed: Sep. 2, 2014

(65) Prior Publication Data
US 2016/0062816 A1    Mar. 3, 2016

(51) Int. Cl.
*G06F 11/07*    (2006.01)
*G06F 21/62*    (2013.01)
(Continued)

(52) U.S. Cl.
CPC ........ *G06F 11/0772* (2013.01); *G06F 11/076* (2013.01); *G06F 11/0709* (2013.01);
(Continued)

(58) Field of Classification Search
CPC . H04L 43/0847; H04L 43/0817; H04L 63/14; H04L 43/0876; H04L 9/0872;
(Continued)

(56) References Cited

U.S. PATENT DOCUMENTS 7,383,191 B1 * 6/2008 Herring ............. G06Q 30/0283
379/111
8,401,833 B2    3/2013 Radibratovic et al.
(Continued)

FOREIGN PATENT DOCUMENTS

CN    202166542 U    3/2012

OTHER PUBLICATIONS

Gill et al. (Understanding Network Failures in Data Centers: Measurement, Analysis, and I mplications), in Proceedings of the ACM SIGCOMM 2011 conference, Aug. 15, 2011.*
(Continued)

*Primary Examiner* — Hadi S Armouche
*Assistant Examiner* — Shu C Gao
(74) *Attorney, Agent, or Firm* — Michael Best & Friedrich LLP (57) ABSTRACT

Outage detection in a cloud based service is provided using usage data based error signals. Usage data is collected from component of the cloud based service or client devices of the cloud based service based on customer actions on the cloud based service. The usage data is aggregated and normalized to generate an error signal from errors generated from a component of the cloud based service. An outage is detected from the error signal. An alert that includes information associated with the outage and one or more customers impacted by the outage is generated.

20 Claims, 7 Drawing Sheets

(51) Int. Cl.
*H04L 12/24* (2006.01)
*H04L 12/26* (2006.01)
*H04L 29/08* (2006.01)

(52) U.S. Cl.
CPC ........ G06F 21/6254 (2013.01); H04L 41/507 (2013.01); H04L 41/5012 (2013.01); H04L 41/5032 (2013.01); *H04L 43/04* (2013.01); *H04L 43/16* (2013.01); *H04L 67/22* (2013.01)

(58) Field of Classification Search
CPC ... H04L 9/3236; H04L 63/1425; H04L 43/04; H04L 41/069; H04L 63/1408; H04L 67/22; H04L 63/166; H04L 43/12; H04L 67/306; H04L 47/785; H04L 43/06; H04L 43/16; H04L 41/0893; H04L 41/18; H04L 41/142; H04L 41/0677; H04L 41/12; H04L 41/5096; H04L 67/10; H04W 12/12; H04W 12/06; H04B 7/18593; G06F 21/552; G06F 9/00; G06F 9/5072
See application file for complete search history.

(56) References Cited

U.S. PATENT DOCUMENTS

| | | | |
|---|---|---|---|
| 8,578,211 B2 | 11/2013 | Reed et al. | |
| 8,620,841 B1* | 12/2013 | Filson | H04L 12/1895 |
| | | | 706/12 |
| 8,635,495 B2* | 1/2014 | Beeco | H04L 41/0677 |
| | | | 714/14 |
| 8,694,835 B2 | 4/2014 | Terris et al. | |
| 8,700,958 B2 | 4/2014 | Vankov et al. | |
| 8,812,586 B1* | 8/2014 | Kulkarni | H04L 41/065 |
| | | | 709/203 |
| 9,495,234 B1* | 11/2016 | Hamman | G06F 11/079 |
| 2004/0210419 A1* | 10/2004 | Wiebe | F25B 49/005 |
| | | | 702/182 |
| 2007/0055482 A1* | 3/2007 | Goodermote | G06Q 30/04 |
| | | | 702/184 |
| 2008/0071571 A1* | 3/2008 | Kim | G06Q 10/00 |
| | | | 705/2 |
| 2008/0106425 A1* | 5/2008 | Deaver | G01R 19/16547 |
| | | | 340/646 |
| 2008/0281660 A1* | 11/2008 | Sajja | G06Q 10/06 |
| | | | 705/7.26 |
| 2012/0275377 A1* | 11/2012 | Lehane | H04L 41/0816 |
| | | | 370/328 |
| 2013/0132854 A1* | 5/2013 | Raleigh | G06F 3/0482 |
| | | | 715/738 |
| 2013/0152047 A1* | 6/2013 | Moorthi | G06F 11/368 |
| | | | 717/124 |
| 2013/0173514 A1 | 7/2013 | Cruickshank, III et al. | |
| 2014/0047106 A1 | 2/2014 | Leung et al. | |
| 2014/0075567 A1* | 3/2014 | Raleigh | H04W 12/10 |
| | | | 726/26 |
| 2014/0089243 A1* | 3/2014 | Oppenheimer | G06F 21/50 |
| | | | 706/46 |
| 2015/0163121 A1* | 6/2015 | Mahaffey | G06F 11/0766 |
| | | | 707/687 |

OTHER PUBLICATIONS

Chen, et al.,"Online Tracking of Component Interactions for Failure Detection and Localization in Distributed Systems", In IEEE Transactions on Systems, Man, and Cybernetics—Part C: Applications and Reviews, vol. 37, No. 4, Jul. 2007, pp. 644-651.

Momken, Bahareh., "Avaya Aura™ Communication Manager Software Based Platforms", Published on: Nov. 2010 Available at: https://downloads.avaya.com/css/P8/documents/100018347.

Do, et al., "Trouble Dashboard: A Distributed Failure Monitoring System for High-End Computing", In International Conference on Computing and Communication Technologies, Jul. 13, 2009, 7 pages.

Gill, et al., "Understanding Network Failures in Data Centers: Measurement, Analysis, and Implications", In Proceedings of the ACM SIGCOMM 2011 conference, Aug. 15, 2011, 12 pages.

StruxureWareTMData CenterOperation, Retrieved on: Jul. 4, 2014 Available at: http://www.rtsystems.co.za/documents/products/whitespace/StruxureWare%20Data%20Sheet.pdf.

* cited by examiner

DETECTION OF OUTAGE IN CLOUD BASED SERVICE USING USAGE DATA BASED ERROR SIGNALS

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications and services are dispersed across networks and locations. Dispersed computing resources are remotely controlled and managed. Usually, manual solutions provide installation and configuration support to cloud computing assets. Manual installation solutions by human components of widely dispersed computing resources are not cost effective.

Conventional error monitoring solutions for cloud computing systems have limitations. Individual components of the cloud computing systems monitor health related metrics locally. Information generated by monitoring processes are usually consumed locally. Any actions based on the information are attempted locally and results of the actions may be logged or discarded locally.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing outage detection in a cloud based service using usage data based error signals. In some example embodiments, a management application of the cloud based service may collect usage data. The usage data may also be referred to as passive data. The usage data may include measurements of customer actions on the cloud based service, stored in log files. The usage data may be aggregated and normalized to generate an error signal. An outage may be detected from the error signal. An alert that includes information associated with the outage and one or more customers impacted by the outage may be generated.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, detection of an outage in a cloud based service may be provided using usage data based error signals by a management application. Usage data may be collected, aggregated, and normalized to generate an error signal. An alert that includes information associated with the outage and one or more customers impacted by the outage may be generated.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide outage detection in a cloud based service using usage data based error signals. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
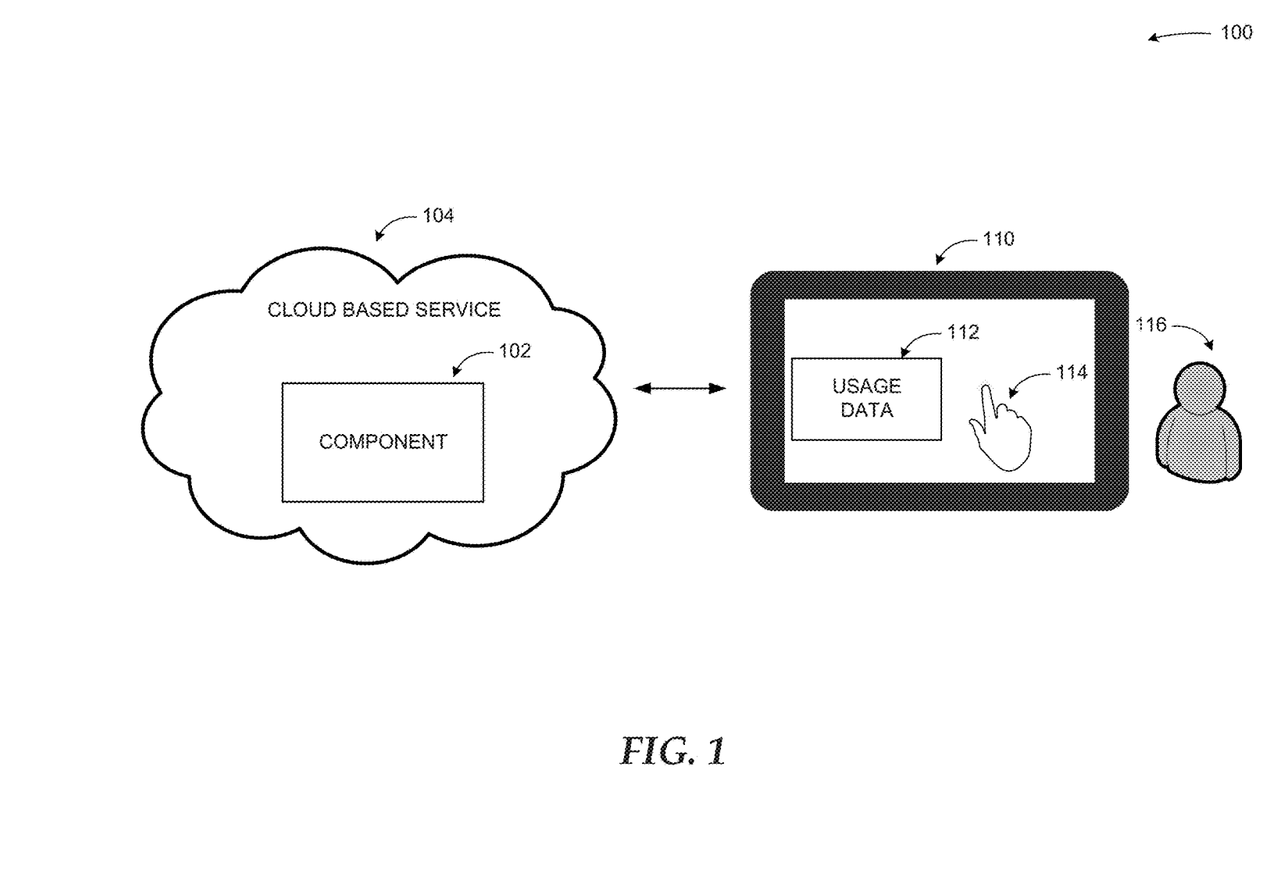
FIG. 1 is a conceptual diagram illustrating an example of outage detection in a cloud based service using usage data based error signals, according to embodiments.

FIG. 1 is a conceptual diagram illustrating an example of outage detection in a cloud based service using usage data based error signals, according to embodiments.

In a diagram 100, a cloud based service 104 may provide services to a customer 116 through a client device 110. The cloud based service 104 may provide an expansive variety of services through a client interface at the client device 110. The services may include document sharing, e-mail services, storage services, among others. In addition, the customer 116 (who is authorized to interact with the client device 110) may be an entity that includes a person, multiple persons, a group of persons, or an organization, among others. The customer 116 may also be a part of another entity such as a tenant that is allowed to interact with the cloud based service 104. The tenant may have access rights to and reserved resources at the cloud based service 104 which may be delegated to its members such as the customer 116.

The cloud based service 104 may be a distributed application that provides services through one or more computing devices that execute one or more components of the distributed application. The one or more computing devices may be connected through one or more networks that use wired or wireless infrastructure. An example of the cloud based service 104 may include an e-mail service. The e-mail service may be hosted in multiple computing devices. The e-mail service may be divided between the computing devices based on an available processing capacity of each computing device. In another example scenario, the cloud based service 104 may include a document sharing service. The document sharing service may distribute stored documents across multiple computing devices based on available storage capacity of each computing device. The examples of the cloud based service 104 as an e-mail service and a document sharing service were not provided in a limiting sense. The cloud based service 104 may include any distributed computation solution that provides a service to one or more customers such as the customer 116.

The customer 116 may be allowed to interact with the cloud based service 104 through the client device 110. The client device 110 may include a number of computing devices such as a desktop computer, a smart phone, a notebook computer, a tablet computer, among others. The customer 116 may interact with the cloud based service 104 through a client interface of the cloud based service 104 that is provided by the client device 110. Alternatively, the cloud based service 104 may provide the client interface and the client device 110 may render the client interface within a client application. The customer 116 may interact with the client interface through a number of input modalities that may include a touch based action 114, a keyboard based input, a mouse based input, among others. The touch based action 114 may include a number of gestures such as a touch action, a swipe action, among others.

One or more interactions of the customer 116 with the client interface of the cloud based service 104 may be monitored and stored within a usage data 112. The usage data 112 may also be referred to as passive data. The usage data 112 may include measurements of customer actions on the cloud based service 104. An example of the usage data 112 may include measurements captured when the customer 116 initiates the client interface of an e-mail service through actions such as authentication actions and reads one or more e-mails associated with a user account of the customer 116. Another example of the usage data 112 may include measurements captured when the customer 116 initiates an editing client interface of a document sharing service to edit the document. The usage data 112 may also include measurements captured when the customer 116 edits the document and saves the document. The usage data 112 may be anonymized prior to processing by removing private data. An example of private data may include customer identification data such as an identity of the customer 116, a location of the customer 116, among others.

The error signal may include information associated with a component 102 of the cloud based service 104 that may generate the errors. An outage detected from the error signal may be mapped to the component 102. An alert transmitted to a stakeholder, to inform the stakeholder of the outage, may include information about the component 102 and errors generated by the component 102.

While the example system in FIG. 1 has been described with specific components including the cloud based service 104, the component 102, and the usage data 112, embodiments are not limited to these components or system configurations and can be implemented with other system configuration employing fewer or additional components.

Figure 2:
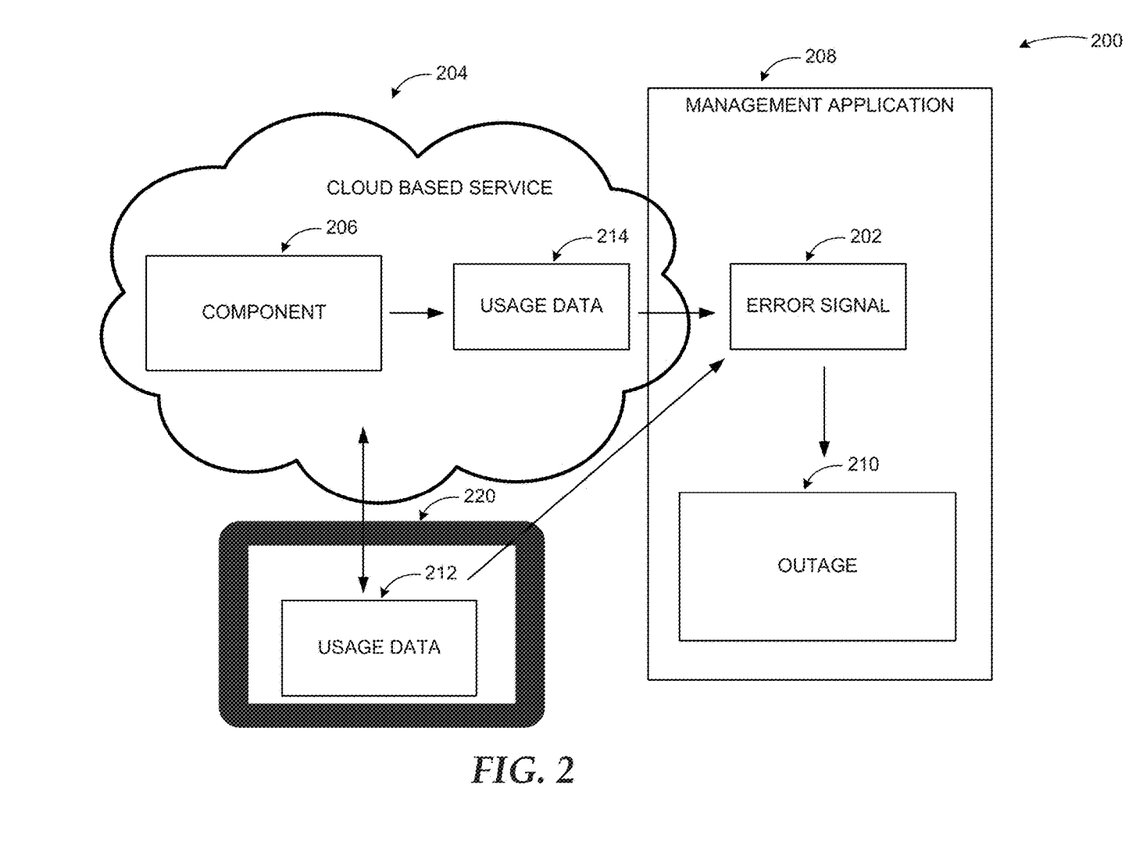
FIG. 2 illustrates components of a scheme to detect an outage in a cloud based service using usage data based error signals, according to embodiments.

FIG. 2 illustrates components of a scheme to detect an outage in a cloud based service using usage data based error signals, according to embodiments.

In a diagram 200, a scheme to detect an outage 210 on a cloud based service 204 using usage data 212 and usage data 214 based error signal 202 may be described. The outage 210 may include one or more service issues or one or more regressions of one or more components of the cloud based service 204. A management application 208 may collect the usage data 214 associated with a component 206 of the cloud based service 204. The component 206 may include a computing device such as a server that executes one or more parts of the cloud based service 204.

The usage data 214 and the usage data 212 may be collected to generate the error signal 202. The usage data 214 may be stored by the cloud based service 204 to capture measurements of one or more customer actions on the cloud based service 204. The usage data 212 may be stored by a client device 220 to capture measurements of one or more customer actions on the cloud based service 204. The measurements may capture errors associated with the customer actions on the cloud based service 204.

The client device 220 may capture the usage data 212 and transmit the usage data 212 to an analysis application such as the management application 208. The management application 208 may receive the usage data 212. In addition, the usage data 214, captured by the cloud based service 204, may also be retrieved from the cloud based service 204. The usage data 212 and the usage data 214 may be processed to detect the outage 210 of the component 206.

The usage data 212 may be captured in log files by the client device 220. The usage data 214 may also be captured in log files by the cloud based service 204. The management application 208 may generate the error signal 202 from the usage data 214 and the usage data 212 by processing the log files. The log files may be processed by parsing the log files to detect one or more errors associated with the component

206. The usage data 214 and the usage data 212 may be anonymized, aggregated, and normalized to generate the error signal 202. Number of errors in the error signal 202 may be compared to an outage threshold value to detect the outage 210.

Although provided examples may illustrate detection of the error signal 202 from the usage data 214 and the usage data 212, the example were not provided in a limiting sense. The error signal 202 may be generated from the usage data 214 or the usage data 212.

Figure 3:
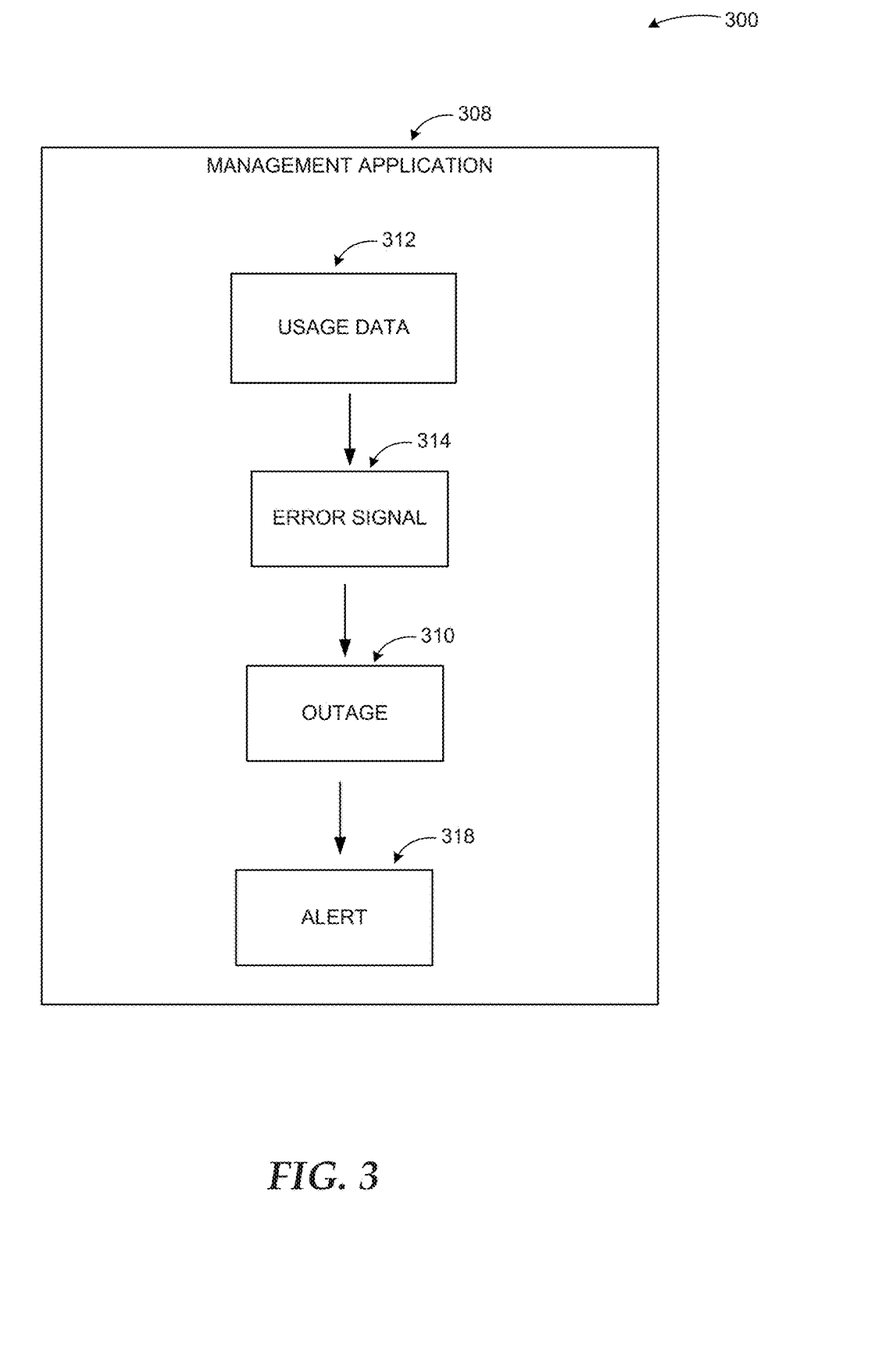
FIG. 3 illustrates detailed view of a scheme to detect an outage in a cloud based service using usage data based errors signals, according to embodiments.

FIG. 3 illustrates additional components of a scheme to detect an outage in a cloud based service using usage data based error signals, according to embodiments.

In a diagram 300, a management application 308 may collect usage data 312. The usage data may be normalized by multiplying data points of the usage data 312 with an adjustable factor to adjust the data points to be within a range of values. The adjustable factor may be configurable by a stakeholder of the cloud based service such as an administrator of the cloud based service, a customer associated with the usage data 312, among others. In an example scenario, the range of values may include a range from 0 to 100.

The data points may initially include values outside the range. The adjustable factor may be adjusted to a value that may allow the data points to reside within the range in response to a multiplication operation of the data points with the adjustable factor. An example of data points may include a response delay measurement associated with a customer action on the cloud based service.

The usage data 312 may be processed to compare the usage data 312 against an error threshold value within the range of values. The error threshold value may be configurable by a stakeholder. The error threshold value may be adjusted to a high value such as a value over 70, for a range of 0 to 100, to increase a sensitivity of detecting an error. In an example scenario, a data point with a measurement, such as a value of 75, may be detected as an error in response to evaluating the measurement to exceed the error threshold value that has a value, such as 70. Alternatively, a data point that has a value such as 65 that is below a threshold value such as 70 may not be labeled as an error. After processing the usage data 312, any detected errors may be included in the error signal 314.

The error threshold value may also be adjusted to a lower value such as value below 30, for a range of 0 to 100, to decrease a sensitivity of detecting an error. In an example scenario, a data point with a measurement such as a value of 35 may be detected as an error in response to evaluating the measurement to exceed the error threshold value that has a value such as 30. In addition, the stakeholder may be allowed to configure the adjustable factor, the range of values, and the error threshold value.

The error signal 314 may be analyzed to compute an error count from a number of errors associated with a component of the cloud based service, in the error signal. The errors may include one or more malfunctions of a component of the cloud based service that is attempting to execute operations associated with a customer action. The error count may be compared to an outage threshold value.

The outage 310 may be detected in response to a determination that the number of errors exceed the outage threshold value. The outage 310 may be weighed with a high value when the number errors exceed the outage threshold value. In an example scenario, a high value may include a value of 6 to 10 in a range of 0 to 10. The high value may increase based on a size of a variance between the number of errors that exceed the outage threshold value.

The range of 0 to 10 may include a normalized range for the number of errors that may be divided by a factor to fit the number of errors within the range. In the range, a value 0 may indicate a lack of errors. A value of 10 may indicate a maximum number of errors possible within the error signal 314. In an example scenario, 60 detected errors within a range that includes 100 maximum number of errors may be divided by a factor of 10 to normalize the detected errors to a value of 6 within a range of 0 to 10.

Alternatively, the outage 310 may still be detected if the number of errors in the error signal 314 falls below an outage threshold value within a small variance of the outage threshold value. An example of a small variance may be values of 1 or 2 within a range of 0 to 10. In an example scenario, the outage 310 may be detected if the number of errors may be 6 that falls below an outage threshold value of 7 within a range of 0 to 10. The value of 6 may be within a small variance (such as 2) of the outage threshold value of 7. The outage 310 may be weighed with a medium value such as 1 to 5 within a range of 0 to 10. The medium value may increase as the number of errors approach the outage threshold value.

An alert 318 may be generated in response to a detection of the outage 310 from the error signal 314. Information describing the outage 310 and one or more customers affected by the outage 310 may be inserted into the alert 318. The alert may be transmitted to a stakeholder who may be the one or more customers affected by the outage 310. The alert may also include a high value or a medium value used to weigh the outage 310.

Although provided examples may illustrate detection of the outage 310 from a component of the cloud based service, the examples were not provided in a limiting sense. More than one outage may be detected for the component as well as other components by analyzing the usage data 312 to detect errors. The errors may be processed to generate one or more error signals associated with one or more components of the cloud based service.

Figure 4:
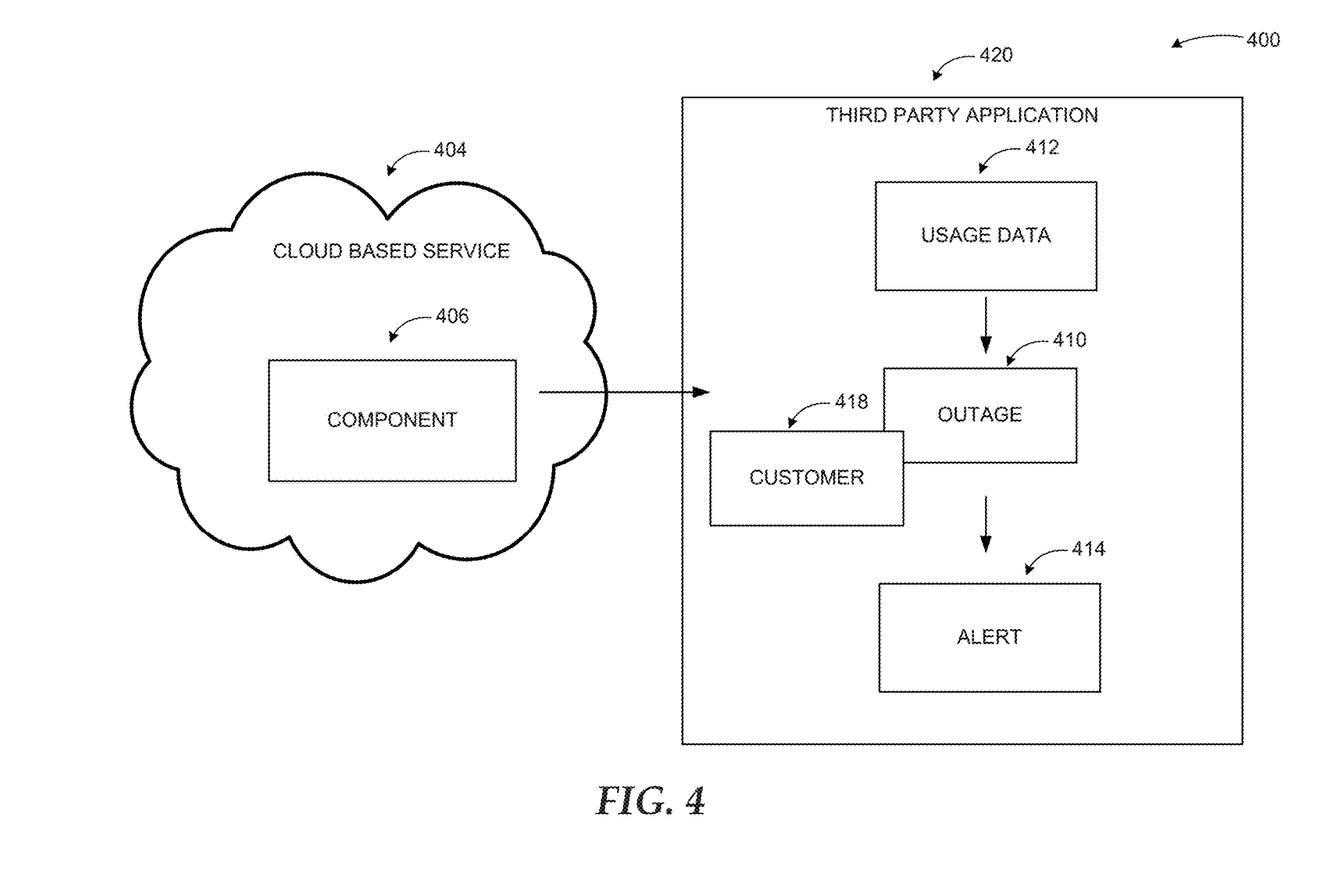
FIG. 4 illustrates another example of a scheme to detect an outage in a cloud based service using usage data based error signals, according to embodiments.

FIG. 4 illustrates another example of a scheme to detect an outage in a cloud based service using usage data based error signals, according to embodiments.

In a diagram 400, a third party application 420 may generate an alert 414 based on an outage 410 detected from analysis of an usage data 412 associated with a component 406 of a cloud based service 404. The third party application 420 may be authorized to retrieve the usage data 412 from a cloud based service 404. An authentication scheme of the cloud based service 404 may verify an authorization of the third party application 420 to retrieve the usage data 412. The cloud based service 404 may also transmit the usage data 412 to the third party application 420 on demand or on a schedule.

The third party application 420 may process the usage data 412 to detect one or more errors associated with the component 406. The errors may be aggregated based on one or more common criteria such as an identification of the component 406 and a type of the component 406. The errors may also be anonymized and normalized. The errors may be inserted into an error signal. The error signal may be processed to detect the outage 410 by comparing the number of errors in the error signal to an outage threshold value.

One or more customers such as a customer 418 affected by the outage 410 may be identified. The customer 418 may be identified based on a customer action that is associated with one or more of the errors generated by the component

406. Furthermore, the alert 414 may be generate that includes information associated with the outage 410 and the customer 418. The outage 410 may include information such as a number of errors that cause the outage 410, identifying information associated with the errors, identifying information associated with the component 406, a time frame of the outage 410, among others.

A customized alert such as the alert 414 may be generated for the customer 418. The alert may include information associated with errors that impact the customer 418 and the outage 410. The alert may be transmitted to the customer. Furthermore, a tenant may be identified that includes the customer 418 and other customers. The tenant may be identified from an attribute of the customer 418 and the other customers that associate the customer 418 and the other customers with the tenant. A customized alert may be generated for the tenant. The customized alert may include information associated with errors that affect the customer and the other customers, the outage 410, among others. The alert may be transmitted to the tenant. The outage 410 may also be mapped to the component 406 based on errors in the error signal generated by the component 406.

The technical effect of detection of an outage in a cloud based service using usage data based error signal may be enhancements in failure detection and outage reporting to encompass a distributed system and components of the distributed system compared to individual component based solutions.

The example scenarios and schemas in FIG. 1 through 4 are shown with specific components, data types, and configurations. Embodiments are not limited to systems according to these example configurations. Providing outage detection in a cloud based service using usage data based error signals may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
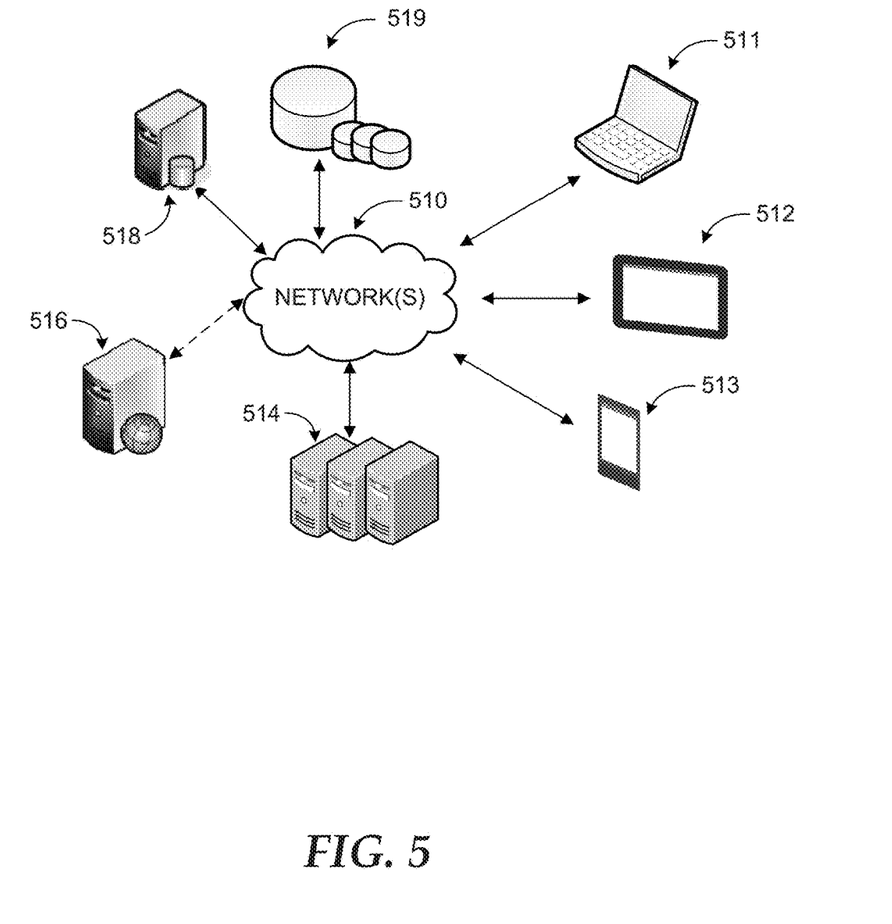
FIG. 5 is a simplified networked environment, where a system according to embodiments may be implemented.

FIG. 5 is an example networked environment, where embodiments may be implemented. A management application configured to provide outage detection in a cloud based service using usage data based error signals may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A management application may detect an outage based on analysis of usage data associated with a component of a cloud based service. An error signal of errors generated by the component may be aggregated from the usage data. The outage may be detected from the error signal. The outage may be presented to a stakeholder through an alert. The management application may store data associated with the usage data in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide outage detection in a cloud based service using usage data based error signals. Furthermore, the networked environments discussed in FIG. 5 are for illustration purposes only. Embodiments are not limited to the example applications, modules, or processes.

Figure 6:
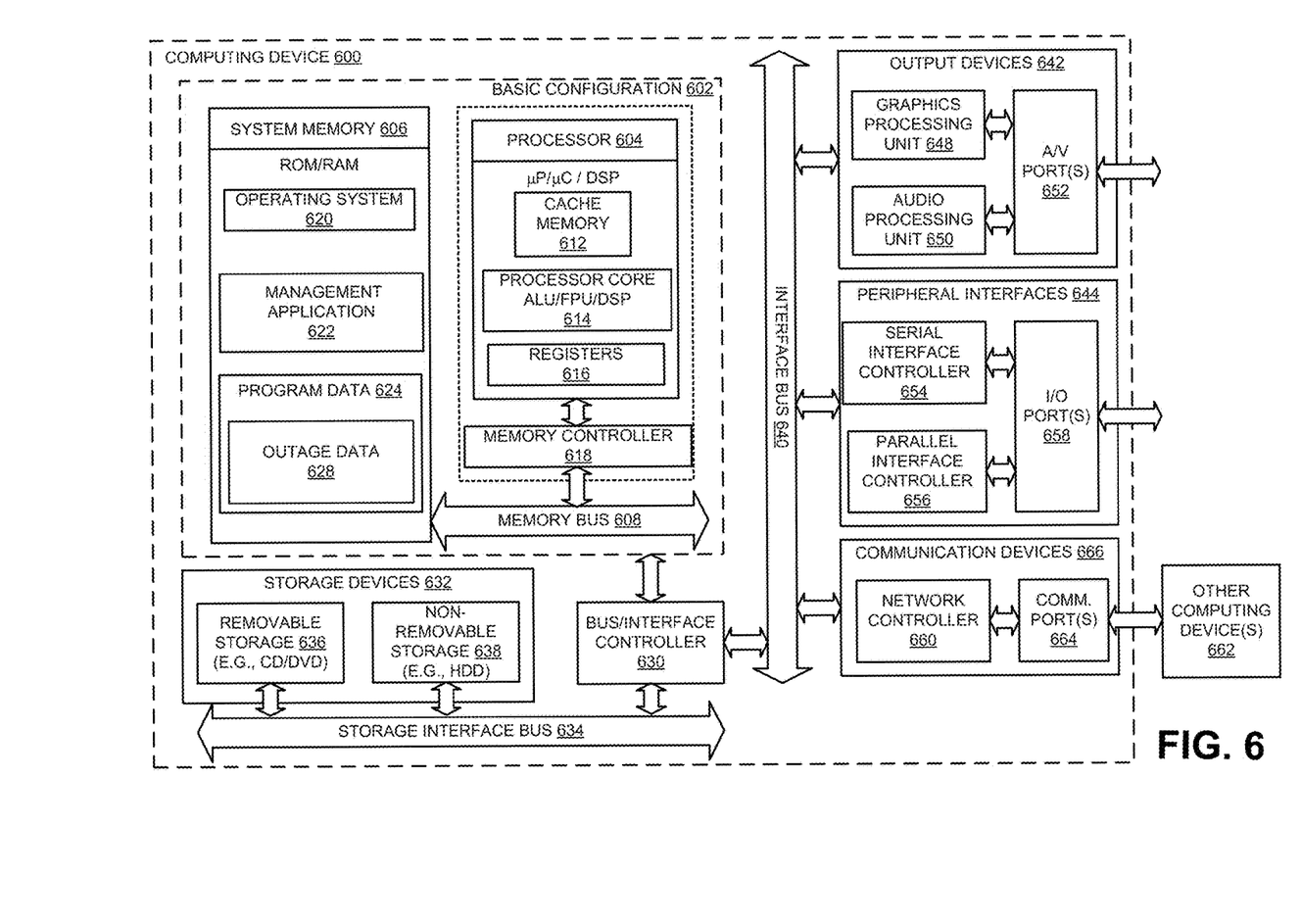
FIG. 6 illustrates a general purpose computing device, which may be configured to provide outage detection in a cloud based service using usage data based error signals.

FIG. 6 illustrates a general purpose computing device, which may be configured to provide outage detection in a cloud based service using usage data based error signals, arranged in accordance with at least some embodiments described herein.

For example, the computing device 600 may be used to provide outage detection in a cloud based service using usage data based error signals. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (μP), a microcontroller (μC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604. The processor 604 may include a hardware analytics processor. The analytics processor may be custom constructed to execute a management application 622. The analytics processor may include hardware components optimized to execute instructions of the management application 622. The hardware components may execute the instructions an order of magnitude faster compared to a general purpose processor.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, the management application 622, and a program data 624. The management application 622 may detect an outage from usage data associated with customer actions on a cloud based service. The management application 622 may generate an error signal aggregated from the usage data. The outage, among other information, may be presented to a stakeholder through an alert. The program data 624 may include, among other data, an outage data 628, or the like, as described herein. The outage data 628 may include information associated customers impacted by the outage and error signals aggregated from the usage data.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include outage detection in a cloud based service using usage data based error signals. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
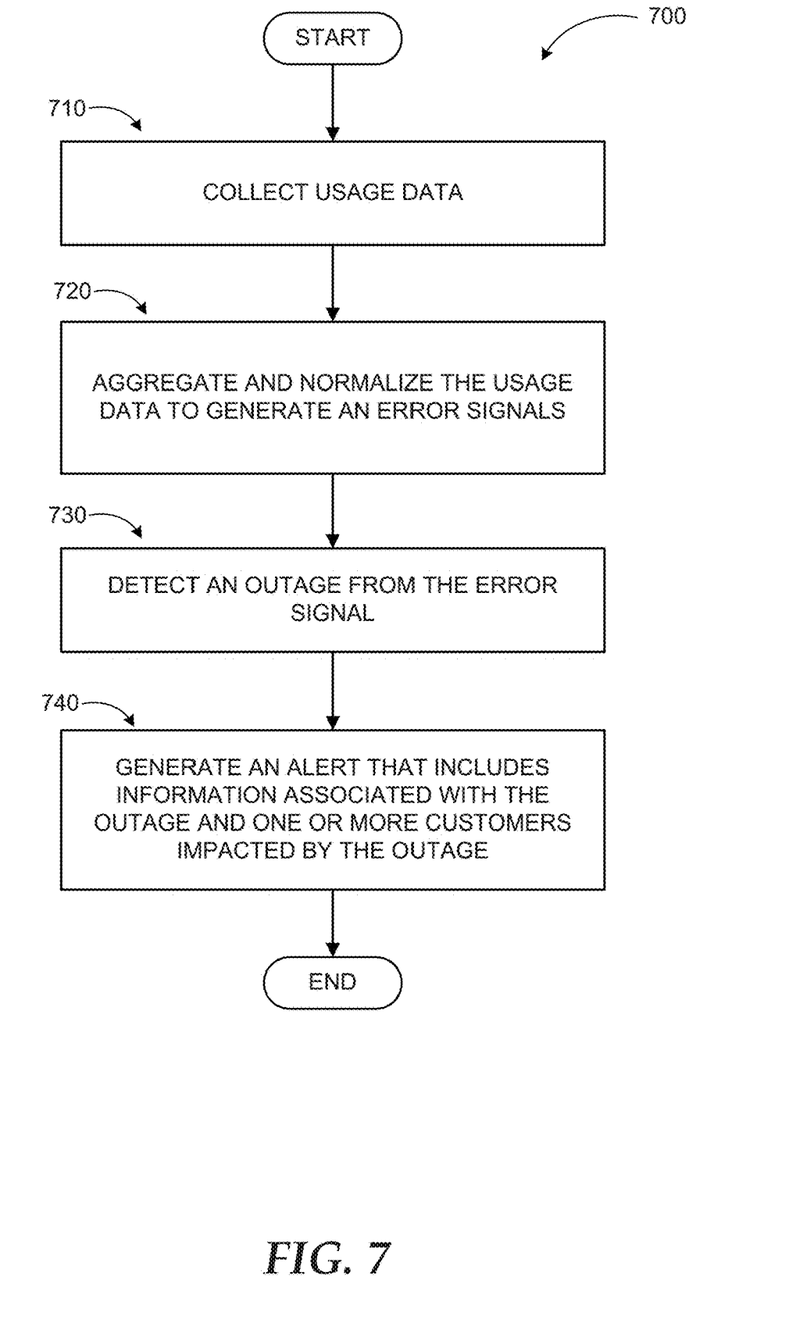
FIG. 7 illustrates a logic flow diagram for a process to provide outage detection in a cloud based service using usage data based error signals, according to embodiments.

FIG. 7 illustrates a logic flow diagram for a process to provide outage detection in a cloud based service using usage data based error signals, according to embodiments. Process 700 may be implemented on a management application of the cloud based service.

Process 700 begins with operation 710, where usage data may be collected. At operation 720, the usage data may be aggregated and normalized to generate an error signal. The outage may be detected from the error signal at operation 730. An alert that includes information associated with the outage and one or more customers impacted by the outage may be generated at operation 740.

The operations included in process 700 are for illustration purposes. A management application according to embodiments may be implemented by similar processes with fewer or additional steps, as well as in different order of operations using the principles described herein.

According to some examples, a method that is executed on a computing device to provide detection of an outage in a cloud based service using usage data based error signals may be described. The method may include collecting usage data, aggregating and normalizing the usage data to generate an error signal, detecting an outage from the error signal, and generating an alert that includes information associated with the outage and one or more customers impacted by the outage.

According to other examples, the method may further include retrieving the usage data from one or more components of the cloud based service that collect the usage data as measurements of one or more customer actions on the cloud based service, where the measurements are stored in log files. The usage data may also be retrieved from one or more client devices associated with the cloud based service that collect the usage data as measurements of one or more customer actions on the cloud based service, where the measurements are stored in log files. The usage data may be aggregated into the one or more error signals based on one or more criteria that include an identification and a type of an associated component of the cloud based service. The usage data may also be anonymized to remove one or more private information that include an identification and a location of one or more customers of the cloud based service, while aggregating the usage data.

According to further examples, the method may further include normalizing the usage data by multiplying data points of the usage data with an adjustable factor to adjust the data points to be within a range of values, processing the usage data by comparing the usage data against an error threshold value within the range of values, detecting an error for each one of the data points that has a measurement value exceeding the error threshold value, including the error in the error signal, and allowing a stakeholder to configure the adjustable factor, the range of values, and the error threshold value, where the stakeholder includes an administrator of the cloud based service and one or more customers who are associated with the usage data.

According to some examples, the method may further include analyzing the error signal to compute an error count from a number of errors associated with a component of the cloud based service, in the error signal and comparing the error count to an outage threshold value. The outage may be weighted with a high value in response to a detection that the error count exceeds the outage threshold value. The outage may be weighted with a medium value in response to a detection that the error count falls below the outage threshold within a small variance of the outage threshold value.

According to some examples, a computing device to provide detection of an outage in a cloud based service using usage data based error signals may be described. The computing device may include a memory, a processor coupled to the memory. The processor may be configured to execute a management application in conjunction with instructions stored in the memory. The management application may be configured to collect usage data from a first set of log files associated with one or more components of the cloud based service and a second set of log files associated with one or more client devices of the cloud based service, aggregate and normalizing the usage data to generate an error signal, detect an outage from the error signal and generate an alert that includes information associated with the outage and one or more customers impacted by the outage.

According to other examples, the management application is further configured to identify the one or more customers from a subset of errors in the error signal that cause the outage, where the one or customers are associated with the subset, generate a customized alert for each one of the one or more customers, where the customized alert includes information associated with errors that impact the customer and the outage, and transmit the customized alert to the customer.

According to some examples, the management application is further configured to identify a tenant that includes a subset of the one or more customers from an attribute of the one or more customers that associates the subset with the tenant, generate a customized alert for the tenant, where the customized alert includes information associated with errors that impact the subset and the outage, and transmit the customized alert to the tenant. The outage may also be mapped to a subset of the one or more components of the cloud based service, where the subset generate the errors in the error signal.

According to some examples, a computer-readable memory device with instructions stored thereon to provide detection of an outage in a cloud based service using usage data based error signals may be described. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide detection of an outage in a cloud based service using usage data based error signals, the method comprising:
   monitoring one or more customer actions with a client interface of the cloud based service, wherein the cloud based service includes one of: a document sharing service, an e-mail service and a storage service;
   collecting the usage data from a first set of log files associated with one or more components of the cloud based service and a second set of log files associated with one or more client devices of the cloud based service;
   aggregating and normalizing the collected usage data to generate an error signal by:
      processing the collected usage data by comparing the collected usage data against an error threshold value within a range of values, and
      detecting an error for each data point within the collected usage data that has a measurement value exceeding the error threshold value;
   detecting an outage from the error signal, wherein the outage includes one or more regressions of one or more components of the cloud based service;
   retrieving information associated with the outage, wherein the information associated with the outage includes a number of errors that cause the outage, identifying information associated with the errors and the one or more components generating the errors, and a time frame of the outage;
   identifying one or more customers impacted by the outage from a subset of the one or more customer actions associated with the errors that cause the outage, wherein the one or more customer actions include one of: authentication actions, edit actions and save actions associated with a document;
   generating an alert that includes the retrieved information associated with the outage; and
   transmit the alert to the one or more customers impacted by the outage.

2. The method of claimed 1, further comprising:
   retrieving the collected usage data from the one or more components of the cloud based service that gather the collected usage data as measurements of the one or more customer actions on the cloud based service, wherein the measurements are stored in log files.

3. The method of claim 1, further comprising:
   receiving the collected usage data from one or more client devices associated with the cloud based service that gather the collected usage data as measurements of the one or more customer actions on the cloud based service, wherein the measurements are stored in log files.

4. The method of claim 1, further comprising:
   aggregating the collected usage data into one or more error signals based on one or more criteria that include an identification and a type of an associated component of the cloud based service.

5. The method of claim 1, further comprising:
anonymizing the collected usage data to remove one or more private information that include an identification and a location of one or more customer of the cloud based service, while aggregating the collected usage data.

6. The method of claim 1, further comprising:
normalizing the collected usage data by multiplying data points of the collected usage data with an adjustable factor to adjust the data points to be within the range of values.

7. The method of claim 6, further comprising:
including the error in the error signal.

8. The method of claim 1, further comprising:
allowing a stakeholder to configure the adjustable factor, the range of values, and the error threshold value, wherein the stakeholder includes an administrator of the cloud based service and one or more customers who are associated with the collected usage data.

9. The method of claim 1, further comprising:
analyzing the error signal to compute an error count from a number of errors associated with a component of the cloud based service, in the error signal; and
comparing the error count to an outage threshold value.

10. The method of claim 9, further comprising:
weighing the outage with a high value in response to a detection that the error count exceeds the outage threshold value.

11. The method of claim 9, further comprising:
weighing the outage with a medium value in response to a detection that the error count falls below the outage threshold within a small variance of the outage threshold value.

12. A computing device to provide detection of an outage in a cloud based service using usage data based error signals, the computing device comprising:
a memory;
a processor coupled to the memory, the processor executing a management application in conjunction with instructions stored in the memory, wherein the management application is configured to:
monitor one or more customer actions with a client interface of the cloud based service, wherein the cloud based service includes one of: a document sharing service, an e-mail service and a storage service;
collect the usage data from a first set of log files associated with one or more components of the cloud based service and a second set of log files associated with one or more client devices of the cloud based service;
aggregate and normalize the collected usage data to generate an error signal by:
process the collected usage data by comparing the collected usage data against an error threshold value within a range of values, and
detect an error for each data point within the collected usage data that has a measurement value exceeding the error threshold value;
detect an outage from the error signal, wherein the outage includes one or more regressions of one or more components of the cloud based service;
retrieve information associated with the outage, wherein the information associated with the outage includes a number of errors that cause the outage, identifying information associated with the errors and the one or more components generating the errors, and a time frame of the outage;
identify one or more customers impacted by the outage from a subset of the one or more customer actions associated with the errors that cause the outage, wherein the one or more customer actions include one of: authentication actions, edit actions and save actions associated with a document;
generate an alert that includes the retrieved information associated with the outage; and
transmit the alert to the one or more customers impacted by the outage.

13. The computing device of claim 12, wherein the management application is further configured to:
identify the one or more customers from a subset of errors in the error signal that cause the outage, wherein the one or customers are associated with the subset.

14. The computing device of claim 13, wherein the management application is further configured to:
generate a customized alert for each one of the one or more customers, wherein the customized aim includes information associated with errors that impact the customer and the outage; and
transmit the customized alert to the customer.

15. The computing device of claim 12, wherein the management application is further configured to:
identify a tenant that includes a subset of the one or more customers from an attribute of the one or more customers that associates the subset with the tenant.

16. The computing device of claim 15, wherein the management application is further configured to:
generate a customized alert for the tenant, wherein the customized alert includes information associated with errors that impact the subset and the outage; and
transmit the customized alert to the tenant.

17. The computing device of claim 12, wherein the management application is further configured to:
map the outage to a subset of the one or more components of the cloud based service, wherein the subset generate the errors in the error signal.

18. A hardware computer-readable memory device with instructions stored thereon to provide detection of an outage in a cloud based service using usage data based error signals, the instructions comprising:
monitoring one or more customer actions with a client interface of the cloud based service, wherein the cloud based service includes one of: a document sharing service, an e-mail service and a storage service;
collecting the usage data from a first set of log files associated with one or more components of the cloud based service and a second set of log files associated with one or more client devices of the cloud based service;
aggregating and normalizing the collected usage data to generate an error signal by:
processing the collected usage data by comparing the collected usage data against an error threshold value within a range of values, and
detecting an error for each data point within the collected usage data that has a measurement value exceeding the error threshold value;
detecting an outage from the error signal, wherein the outage includes one or more regressions of one or more components of the cloud based service;
retrieving information associated with the outage, wherein the information associated with the outage includes a number of errors that cause the outage, identifying information associated with the errors and the one or more components generating the errors, and a time frame of the outage;

identifying one or more customers impacted by the outage from a subset of the one or more customer actions associated with the errors that cause the outage, wherein the one or more customer actions include one of: authentication actions, edit actions and save actions associated with a document;

generating an alert that includes the retrieved information associated with the outage; and transmitting the alert to the one or more customers impacted by the outage.

19. The hardware computer-readable memory device of claim 18, wherein the instructions further comprise:

analyzing the error signal to compute an error count from a number of errors associated with a component of the cloud based service, in the error signal;

comparing the error count to an outage threshold; and weighing the outage with a high value in response to a detection that the error count exceeds the outage threshold.

20. The hardware computer-readable memory device of claim 18, wherein the instructions further comprise:

analyzing the error signal to compute an error count from a number of errors associated with a component of the cloud based service, in the error signal;

comparing the error count to an outage threshold; and weighing the outage with a medium value in response to a detection that the error count falls below the outage threshold within a small variance of an outage threshold value.

* * * * *